(12) United States Patent
Hughes et al.

(10) Patent No.: US 10,303,885 B2
(45) Date of Patent: May 28, 2019

(54) METHODS AND SYSTEMS FOR SECURELY EXECUTING UNTRUSTED SOFTWARE

(71) Applicant: Apple Inc., Cupertino, CA (US)

(72) Inventors: Gregory D. Hughes, San Francisco, CA (US); Ivan Krstic, San Francisco, CA (US); Oliver J. Hunt, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 15/275,000

(22) Filed: Sep. 23, 2016

(65) Prior Publication Data

US 2017/0255780 A1    Sep. 7, 2017

Related U.S. Application Data

(60) Provisional application No. 62/302,728, filed on Mar. 2, 2016.

(51) Int. Cl.
| | |
|---|---|
| *G06F 21/00* | (2013.01) |
| *G06F 21/57* | (2013.01) |
| *G06F 9/455* | (2018.01) |
| *G06F 21/53* | (2013.01) |
| *G06F 3/06* | (2006.01) |
| *G06F 12/10* | (2016.01) |

(52) U.S. Cl.
CPC ............ *G06F 21/575* (2013.01); *G06F 3/065* (2013.01); *G06F 3/0622* (2013.01); *G06F 3/0631* (2013.01); *G06F 3/0634* (2013.01); *G06F 9/4552* (2013.01); *G06F 12/10* (2013.01); *G06F 21/53* (2013.01); *G06F 2212/1052* (2013.01); *G06F 2221/033* (2013.01)

(58) Field of Classification Search
CPC .. G06F 9/449; G06F 9/45516; G06F 12/0875; G06F 9/44589; G06F 2009/45595
See application file for complete search history.

(56) References Cited

U.S. PATENT DOCUMENTS

| | | |
|---|---|---|
| 8,646,050 B2 | 2/2014 | Vidrine et al. |
| 9,015,834 B2 | 4/2015 | Salamat et al. |
| 2008/0127142 A1 | 5/2008 | Wrighton et al. |

(Continued)

OTHER PUBLICATIONS

Ping Chen, Yi Fang, Bing Mao, Li Xie, "JITDefender: A Defense against JIT Spraying Attacks", J. Camenisch et al. (Eds.): SEC 2011, IFIP AICT 354, pp. 142-153, 2011. © IFIP International Federation for Information Processing 2011.

(Continued)

*Primary Examiner* — Ghazal B Shehni
(74) *Attorney, Agent, or Firm* — Womble Bond Dickinson (US) LLP (57) ABSTRACT

Methods and systems for securely executing untrusted software are described. In one embodiment, two virtual memory mappings are used (one readable/writeable-RW and the other readable/executable-RX). In one embodiment, compiled software is used at run time through pointers to the RX virtual memory space and a compiler causes the storage of the compiled software in the RW virtual memory space through the use of an executable function (e.g. a memory copy like function) stored in an executable only memory region.

29 Claims, 6 Drawing Sheets

(56) References Cited

U.S. PATENT DOCUMENTS

| | | | |
|---|---|---|---|
| 2011/0191848 A1* | 8/2011 | Zorn | G06F 11/00 |
| | | | 726/22 |
| 2012/0260106 A1 | 10/2012 | Zaks et al. | |
| 2013/0132690 A1 | 5/2013 | Epstein | |
| 2014/0095812 A1 | 4/2014 | McLachlan et al. | |
| 2014/0115292 A1 | 4/2014 | McLachlan et al. | |
| 2015/0095661 A1* | 4/2015 | Sell | G06F 12/1408 |
| | | | 713/193 |
| 2016/0092674 A1 | 3/2016 | Hughes et al. | |

OTHER PUBLICATIONS

ARMv8 Translation Table System and Memory Model, Sep. 6, 2013.
"ARM® Compiler Software Development Guide", Version 5.06u3, http://infocenter.arm.com/help/topic/com.arm.doc.dui0471m/chr1368698326509.html, downloaded Aug. 24, 2016, 3 pages.
"Subversive-C: Abusing and Protecting Dynamic Message Dispatch", Julian Lettner et al., Proceedings of the 2016 USENIX Annual Technical Conference (USENIX ATM '16). Jun. 22-24, 2016. https://www.usenix.org/conference/atc16/technical-sessions/presentation/lettner, 14 pages.

* cited by examiner

METHODS AND SYSTEMS FOR SECURELY EXECUTING UNTRUSTED SOFTWARE

This application claims the benefit of U.S. Provisional Patent Application No. 62/302,728, filed on Mar. 2, 2016, which provisional application is incorporated herein by reference.

BACKGROUND OF THE INVENTION

Data processing systems, such as smartphones, tablet computers, laptop computers, desktop computers, entertainment devices and other consumer electronic systems, are often subject to attacks from malware that can cause malicious attacks on the systems. These attacks can be designed to steal personal information (e.g. the user's credit card information) from the systems or to hijack the systems to perform a task desired by a designer of the malware. As a result, computer security technology has developed many different ways to protect data processing systems from such attacks. For example, a data processing system can be designed to use software that has been signed with a digital signature by a trusted authority (e.g. the vendor of the system), and the system can at run time of the software check the software's signature before beginning to execute the software. The digital signature is included with the software to show that the software can be trusted (and therefore is not malware) and can be executed without causing harm to the system. If each of all of the software components on the system includes a digital signature, then the system may be considered secure from most malicious attacks.

Unfortunately, there is often a need to execute unsigned software (also referred to as unsigned code), and this need often arises in the context of web pages that contain unsigned software such as Javascript, for example. A huge number of web pages include such unsigned software, and this software is often executed by using a Just-In-Time (JIT) compiler that is often included with a web browser. A JIT compiler includes a program that turns bytecode (e.g. a platform independent program that contains instructions) into platform specific executable code that can be immediately executed by a processor on the specific data processing system. For example, source code language statements are compiled by a compiler into bytecode (which is platform independent code that can be sent to any platform for execution), and the JIT compiler converts the bytecode into platform specific code that can be executed by the platform's processor(s). Malware has developed which exploits the use of unsigned code with JIT compilers. An example of such malware uses what is referred to as JIT spraying attack which is further described in U.S. Pat. No. 9,015,834. The use of JIT compilers has exposed vulnerabilities in the security of data processing systems, and numerous attempts to cure these and other vulnerabilities are known in the art including: U.S. Pat. No. 9,015,834; 8,646,050; and U.S. Patent Application Publication Nos.: 201510095661; 201310132690; 2011/0191848; 2008/0127142; 2014/0115292; 2012/0260106; 2014/0095812; and U.S. patent application Ser. No. 14/503,195, filed Sep. 30, 2014.

SUMMARY OF THE DESCRIPTION

Methods and systems for securely executing untrusted software are described. In one embodiment, two virtual memory address mappings are used, and compiled software is stored in one of the virtual memory address spaces and any data written as a result of executing the compiled software is stored in the other virtual memory address space through the use of an executable function stored in an executable only memory region.

In one embodiment, a method for performing such secure execution for untrusted software can include: creating a first virtual memory mapping from a readable and executable (RX) virtual memory address space to physical memory, the physical memory being designated for use in storing code and data produced by a compiler, such as a Just-In-Time (JIT) compiler; creating a second virtual memory mapping from a readable and writeable (RW) virtual memory address space to the physical memory; allocating a memory region in one or more pages of memory, the memory region being at least initially writeable; writing into the memory region an executable function configured to copy data (e.g. one or more executable functions or other data) provided to the function into the RW virtual memory address space at a specified offset, where the RW virtual memory address space is designated for use in storing data used in one or more processes resulting from executing the compiled software stored in the RX virtual memory address space; converting the memory region, after the writing of the executable function, into an execute only memory region having an execute only privilege; storing a pointer to the memory region, the pointer being used during a write operation that uses the executable function to cause a write to occur through the second virtual memory mapping; and compiling the code to create compiled software and storing the compiled software in the physical memory by using the pointer to call for the execution of the executable function to cause the compiled software to be written, through the RW virtual memory address space to the physical memory. In one embodiment, the code which is compiled to create the compiled software is unsigned code (e.g., Javascript code) and the compiler is a JIT compiler, and the JIT compiler compiles the code at run time to create the compiled software. In one embodiment, the JIT compiler is run in a web browser that processes web pages, and the code is associated with one or more web pages. In one embodiment, the RW virtual memory address space can be located at a random address, and the memory region can also be located at a random address (different than the other addresses). In one embodiment, an operating system allocates memory for the web browser and the physical memory is designated for use in storing the code and data produced by the JIT compiler, and this physical memory can be located within the memory allocated for the web browser.

In one embodiment, the method can also include zeroing out all pointers or references (or otherwise discarding such pointers or references) to the RW virtual memory address space after storing the pointer to the memory region. In one embodiment of the method, the JIT compiler is signed code and the web browser is also signed code and the operating system has a set of components, including memory management and virtual memory management components, each of which is signed code. In one embodiment, the operating system can perform a secure boot up procedure which verifies code signatures in a chain of trust starting from a boot read-only-memory (ROM). In one embodiment, the operating system (OS) controls access to memory based upon access privileges which can include RW, RX and execute only and the operating system can change those privileges during runtime (e.g. the kernel of the OS changes a memory region that is initially writeable to a memory region that is execute only). In addition, the operating system can also provide access to memory under a readable, writeable, and executable privilege to software, such as signed software. In one embodiment, all executable software on the data processing system is signed code except for the unsigned code compiled by the JIT compiler. In one embodiment, the call for the execution of the executable function can use a call that refers to the compiled software which is to be written and the call can also include a specified offset which is an offset from a location (e.g. a start location) of the RW virtual memory address space. In one embodiment, the executable function can be similar to a memory copy function in which the destination address of the memory copy function is the RW virtual memory address space at the specified offset. In one embodiment, the physical memory for use in storing executable software and data produced by the JIT compiler is a JIT physical memory region and wherein the memory region which stores the executable function is stored within the JIT physical memory region. In one embodiment, pointers to addresses in the RX virtual memory space are used at run time, during the execution of the web browser that is processing the web page which contains the code that created the compiled software, to invoke one or more functions in the compiled software. In one embodiment, the RX virtual memory space and the RW virtual memory space share the same physical memory.

In another embodiment, a method for securely executing untrusted software can include: compiling, by a compiler prior to run time, software code to create compiled software, the compiled software to be stored in a readable and executable (RX) virtual memory address space at run time, the RX virtual memory address space to be mapped to physical memory by a first virtual memory address mapping; creating, by the compiler, an executable function to be stored in a memory region which is at least writeable when the executable function is written to the memory region at run time, wherein the executable function is configured to copy at run time input data into a readable and writeable (RW) virtual memory address space at a specified offset, the RW virtual memory address space to be mapped to physical memory by a second virtual memory address mapping at run time; creating, by the compiler, executable software which at run time converts the memory region into an execute only memory region and stores a pointer to the converted memory region, the pointer being used during the write operation, at run time by one or more processes resulting from execution of the compiled software in the RX virtual memory address space, wherein at run time when a request from the one or more processes requires writing data, the pointer is used to cause the executable function to cause the data to be written, though the RW virtual memory address space to the physical memory. In this alternative embodiment, the compiler can run before run time and does not run at run time and the software is compiled prior to run time.

In another embodiment, a method can store a DRM (digital rights management) key and optionally also DRM functions or software into a memory region that is initially writeable and then convert the memory region into an execute only memory region, thereby protecting the DRM key and optionally any DRM function or software stored in the memory region. The DRM function in the memory region can be then called to perform a DRM function such as encrypting or decrypting data. In one embodiment, the DRM key itself can include functions or parameters that control execution and such DRM key can be called, after being stored in the execute only memory, to execute the functions in the DRM key. More generally, the method can store other types of functions or software, such as software or executable functions for operations on biometric data or cryptography or operations that could have been implemented as another process with a higher privilege in the system (such as a kernel process) without requiring a context switch to the another process.

The methods described herein can be implemented by data processing systems, such as a smartphone or desktop computer or a laptop computer or tablet computer or entertainment system or other consumer electronic devices or server systems. The methods described herein can also be implemented by one or more data processing systems which execute executable instructions, stored on one or more non-transitory machine readable media, that cause the one or more data processing systems to perform one or more of the methods described herein. Thus, the embodiments described herein include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
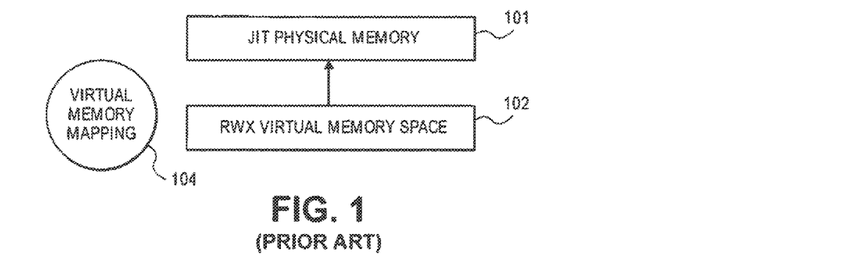
FIG. 1 shows an example in the prior art of how a JIT memory region is mapped as a single RWX virtual memory mapping during Javascript initialization.

FIG. 1 shows a typical implementation in the prior art for executing software through a JIT compiler. A typical example involves a web page which contains software that is provided with the web page in a source code like format such as software written in the Javascript language, and this software is run by a JIT compiler that the web browser uses. In many instances, the web browser includes the JIT compiler. When the web page is loaded by the web browser, the JIT compiler can initialize the Javascript software for execution by allocating physical memory for JIT processes that result from execution of the Javascript software contained in the web page. This physical memory for JIT processes is often mapped through a virtual memory mapping process as is known in the art. For example, the compiled software that is emitted by the JIT compiler and any data that is written or stored by the JIT processes are stored in the JIT physical memory 101, and the locations of those storage operations are determined by the virtual memory mapping 104 which maps addresses from the readable, writeable, and executable virtual memory address space 102 to corresponding addresses in the physical memory 101. The executing software compiled by the JIT compiler uses memory addresses in the readable, writeable, executable (RWX) virtual memory address space 102, and those addresses are mapped through a virtual memory mapping 104 to addresses in the JIT physical memory 101 as is known in the art. Executable software which is emitted by the JIT compiler is stored in physical memory 101 along with any data that is written or stored by the JIT processes which result from the execution of the software compiled by the JIT compiler. The ability to write data into the same space that also includes executable code makes the system shown in FIG. 1 susceptible to JIT spray attacks as is known in the art.

Figure 2:
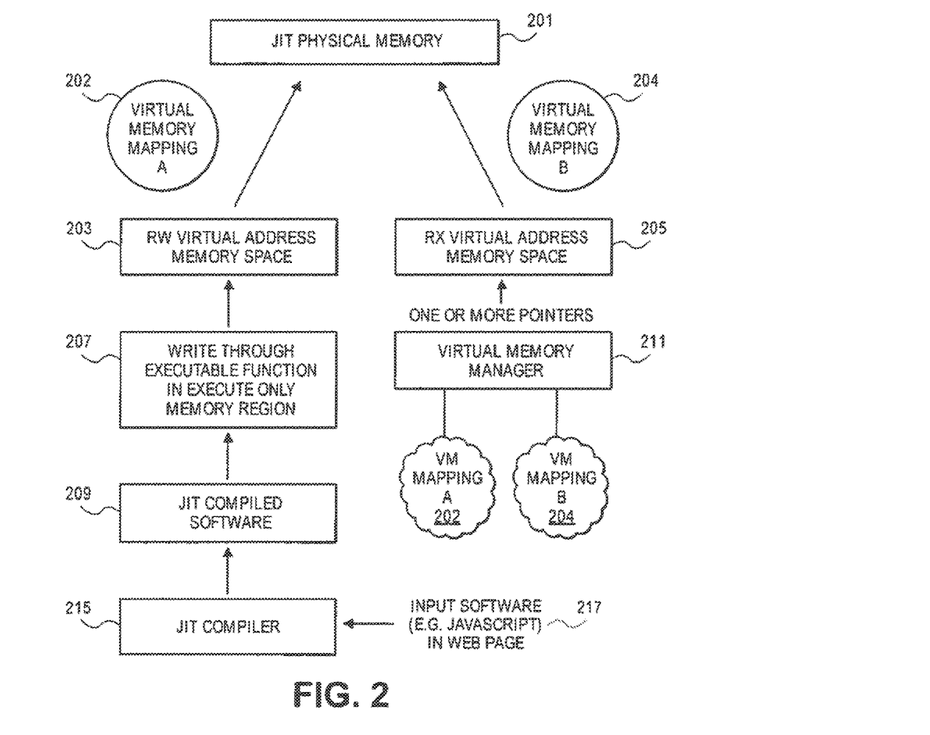
FIG. 2 shows an example according to one embodiment for virtual memory mappings for use with software which is compiled at run time by a JIT compiler.

FIG. 2 shows an example of an embodiment which can provide protection against JIT spray attacks. This embodiment can be particularly useful on systems where signed code is used for all software except for software compiled by a JIT compiler in a web browser or a JIT compiler in other software applications or documents such as pdf documents, etc. The system shown in FIG. 2 uses two different virtual memory mappings to map from two different virtual memory address spaces to the same physical memory. In particular, in the example shown in FIG. 2 virtual memory mapping 202 maps from a readable and writeable virtual memory address space 203 to addresses in the JIT physical memory 201 while the virtual memory map 204 maps addresses in the readable and executable virtual memory address space 205 to addresses in the same physical memory which is JIT physical memory 201. In one embodiment, executable software emitted by the JIT compiler 215 is stored by using at least one executable function 207 in execute only memory to store the emitted software in physical memory 201 through the mapping 202 which causes the executables to be stored in the appropriate locations of the JIT physical memory 201 based upon the virtual memory mapping 202. In one embodiment, the at least one executable function 207 is created by the JIT compiler 215, and this executable function is stored in execute only memory and uses the RW virtual memory address space 203 to write to the physical memory 201 through the virtual memory mapping 202. In one embodiment, a virtual memory manager 211 creates and manages both virtual memory mappings 202 and 204 to assure that they do not collide; in other words, the virtual memory manager 211 ensures that a single physical memory location within physical memory 201 is used by only one of the two maps at any one point in time thereby preventing a collision between the two different mappings. Pointers to addresses in the RX virtual memory address space 205 are used at run time to invoke one or more functions or processes in the JIT compiled software. In one embodiment, the JIT compiler 215 and the virtual memory manager 211 can provide and use those pointers to addresses in the RX virtual memory address space 205 so that the JIT compiled software, such as JIT compiled software 209, can be executed at run time after the JIT compiled software 209 has been stored in the JIT physical memory 201. For example, execution of the JIT compiled software or the web browser's software can use one of these pointers to invoke or call a function in the JIT compiled software stored in the JIT physical memory 201. In one embodiment, the RX virtual memory space and the RW virtual memory space share the same physical memory 201.

In operation, the system shown in FIG. 2 receives input software 217 which can be, for example, Javascript in a web page. The JIT compiler 215, which can be part of a web browser, in one embodiment compiles the Javascript (or other input software 217) to create JIT compiled software 209 which is stored in physical memory 201 by using the executable function 207 to store the compiled software 209 into physical memory 201 through the virtual memory mapping 202. The executable function 207 uses addresses in the RW virtual address memory space 203 (e.g. addresses selected by JIT compiler 215) to store the JIT compiled software 209 into the JIT physical memory 201. In an alternative embodiment, write operations which are required as a result of executing the JIT compiled software 209 are written to physical memory 201 through the executable function 207 which is stored in an execute only memory region and which causes writing of the data to the physical memory 201 using addresses in the RW virtual memory address space 203 which are mapped by mapping 202 to the JIT physical memory 201 to cause the data to be stored in physical memory 201.

While FIG. 2 and the rest of this description is directed to a JIT compiler and to processes which occur in a Just-In-Time compilation system, it will be appreciated that alternative embodiments can be employed in systems which use compilers which create executable code prior to run time and thus are not JIT compilers. Moreover, in other embodiments, systems may be employed in which an interpreter is used rather than a JIT compiler. Thus, the methods and systems described herein can also be employed in non-JIT compiler systems and also in interpreter systems.

Figure 3:
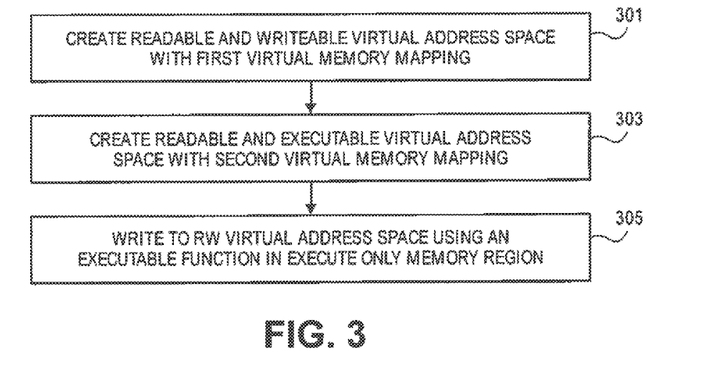
FIG. 3 is a flowchart which illustrates an example of a method according to one embodiment described herein.

FIG. 3 shows a simplified flowchart which illustrates a method according to one embodiment for creating and using a Just-In-Time compilation system shown in FIG. 2. In operation 301, the Just-In-Time compiler or some other software component can create the readable and writeable virtual memory address space which uses a first virtual memory mapping. The RW virtual memory address space 203 shown in FIG. 2 and its corresponding virtual memory mapping 202 is one example of the result of operation 301. In operation 303, the JIT compiler or some other software component creates a readable and executable virtual memory address space with a corresponding second virtual memory mapping. The RX virtual memory address space 205 and its corresponding virtual memory map 204 is one example of the result of operation 303. The two different virtual memory mappings are mapped, in one embodiment, to the same physical address space in physical memory and can be managed by a virtual memory manager, such as virtual memory manager 211 shown in FIG. 2. In one embodiment, when the JIT compiler emits JIT compiled software, such as JIT compiled software 209, the storage of that compiled software will be performed through an executable function which is stored in execute only memory and will use addresses in the RW virtual memory address space to cause storage to physical memory 201 through a virtual memory mapping created in operation 301, which corresponds to virtual memory mapping 202 shown in FIG. 2. In one embodiment, all JIT compiled software that is emitted by the JIT compiler is stored in physical memory through the use of the executable function stored in execute only memory.

Figure 4:
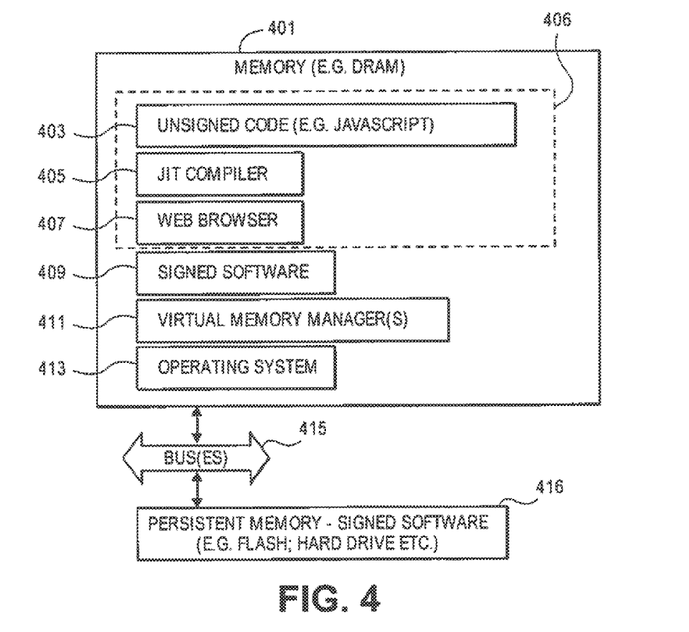
FIG. 4 shows examples of software components which can be stored at run time in memory of a data processing system, such as DRAM memory of the data processing system.

FIG. 4 will now be used to provide a description of the various software components which can be used to create the system shown in FIG. 2. The memory 401, which can be DRAM or other forms of volatile memory, includes operating system software 413, one or more virtual memory managers 411, signed software 409, one or more web browsers 407, one or more JIT compilers 405, and unsigned code 403 which can be, for example, Javascript source code contained within a web page. The various software components shown in memory 401 can be loaded during boot up or launching of software to create the instantiations of the software components shown within memory 401. For example, during a secure boot up process the operating system software 413 may be loaded from persistent memory 416 through one or more buses 415, such that after the boot up process, the operating system software 413 has been loaded into memory 401 and can execute on the data processing system which includes both memory 401 and the one or more buses 415 and the persistent memory 416 as well as one or more processors as is known in the art (see FIG. 7 for an example of a data processing system). In one embodiment, the persistent memory may contain images of all of the executable software on the system, and each of those software components may be signed including, for example the one or more virtual memory managers 411, the signed software 409 (which may be other software components such as pdf viewers, email applications, web processing applications, etc.). Further, the web browser 407 may be loaded from persistent memory 416 and may be signed software and may include the JIT compiler 405 which may also be signed software. Thus, in one embodiment, all of the executing software on the system shown in FIG. 4 may be signed except for the unsigned code 403. In one embodiment, the operating system software 413 allocates physical memory for each of the various software components, including for example the web browser 407. In one embodiment, the web browser's allocated memory region may be configured to also include the memory region for the JIT compiler 405 as well as the JIT physical memory which stores the unsigned code 403. In this case, the memory region 406 is defined or allocated for the web browser 407 and the JIT compiler 405 as well as for the JIT physical memory, such as JIT physical memory 201 shown in FIG. 2. In one embodiment, the operating system software 413 controls access to the memory based upon access privileges assigned or given to the various software components, and these access privileges can include RW, RX, execute only and RWX and can change these access privileges (such as changing a memory region from RW to execute only).

The virtual memory manager software component 411 can in one embodiment provide virtual memory management for all the software components and can use conventional page tables to provide the mapping from a plurality of virtual address spaces to physical memory.

Figure 5:
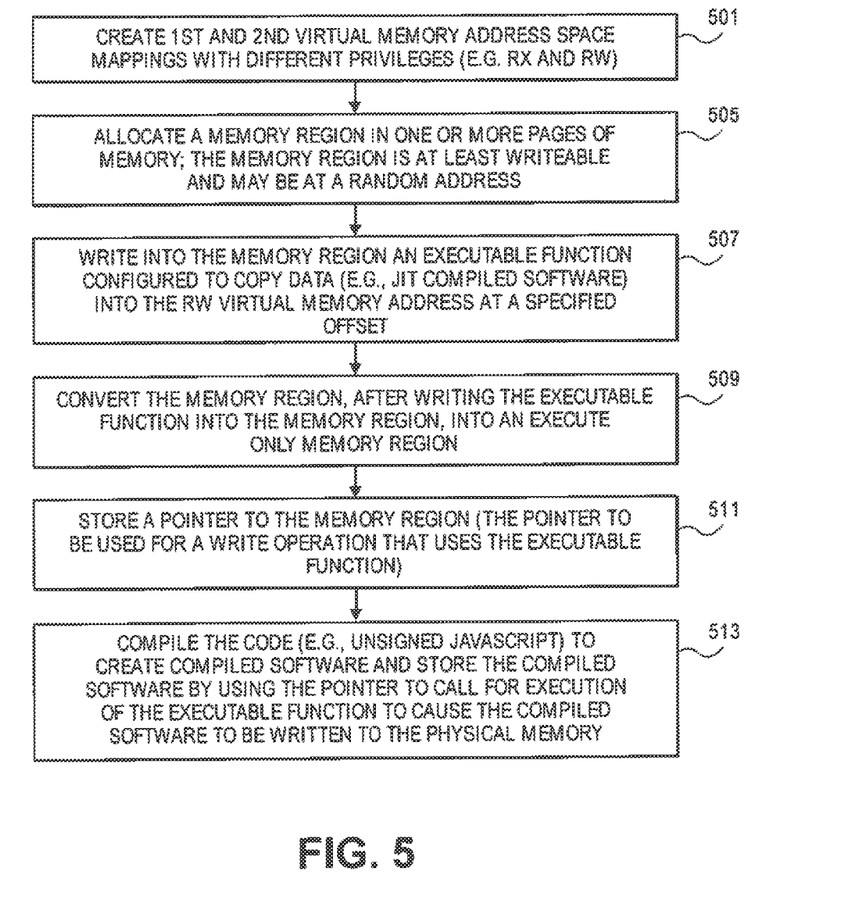
FIG. 5 is a flowchart which illustrates a method according to an embodiment described herein.

FIG. 5 shows a method according to one embodiment which can implement the system shown in FIG. 2. In operation 501, two different virtual memory mappings with different privileges are created; in one embodiment, operation 501 is performed at run time by a JIT compiler working in conjunction with one or more virtual memory managers to create the two different virtual memory mappings. In one embodiment, one virtual memory address space has readable and executable privileges while the other virtual memory address space has readable and writeable access privileges. In one embodiment, the operation 501 creates the virtual memory mappings 202 and 204 as well as their respective corresponding virtual memory address spaces 203 and 205. In operation 505, the JIT compiler, such as JIT compiler 215, allocates or otherwise obtains a memory region in one or more pages of memory, and this memory region is at least writeable and may be allocated at a random address. Then in operation 507, the JIT compiler, or other software component, writes into the memory region allocated in operation 505 an executable function which is configured to copy data (e.g. JIT compiled software) into the RW virtual memory address space at a specified offset (which can be specified by the JIT compiler). In one embodiment, this executable function can be similar to a memory copy function which copies data at a source to a destination, where the destination in this case is a destination specified in the RW virtual memory address space at a specified offset from a location of that address space, such as the first address in that address space. The data which is to be copied is in one embodiment the JIT compiled software, such as the JIT compiled software 209, compiled at run time by a JIT compiler. In other embodiments, any write required by a process resulting from execution of the JIT compiled software can also be performed through the executable function which is written into the memory region in operation 507; thus in this other embodiment, all write operations required by the JIT compiled software can be performed by calling the executable function written in operation 507 after the memory region has been converted in operation 509. In operation 509, the memory region is converted, after writing the executable function into the memory region, into an execute only memory region. Thus, the write operation is implemented by calling the executable function in what has become an execute only memory region through operation 509. Then in operation 511, a pointer to the memory region is stored to allow the executable function to be called. The pointer is to be used during a write operation required by the JIT compiler when it emits JIT compiled software, such as the JIT compiled software 209. After the pointer has been stored in operation 511, the JIT compiler emits JIT compiled software and stores the JIT compiled software by using the pointer to call for the execution of the executable function in the execute only memory region which in turn will cause the data to be written through the RW virtual memory address space (see operation 513). In one embodiment, after storing the pointer, the pointers or addresses to the address used to write through the RW virtual memory space are discarded (e.g. they are set to all zeros).

The method of FIG. 5 in effect hides the location of addresses for write operations when the JIT compiler emits JIT compiled software because those addresses are in effect obtained through the executable function which is in execute only memory thereby rendering it impossible to read the address for write operations from that memory region. In one embodiment, the executable function can be similar to a memory copy function to cause data to be written at run time of the JIT compiler through the RW virtual memory space, and thus this execute only memory region hides the secret location of the RW space and thus writing to this space is protected and thereby foils a JIT spray attack.

Figure 6:
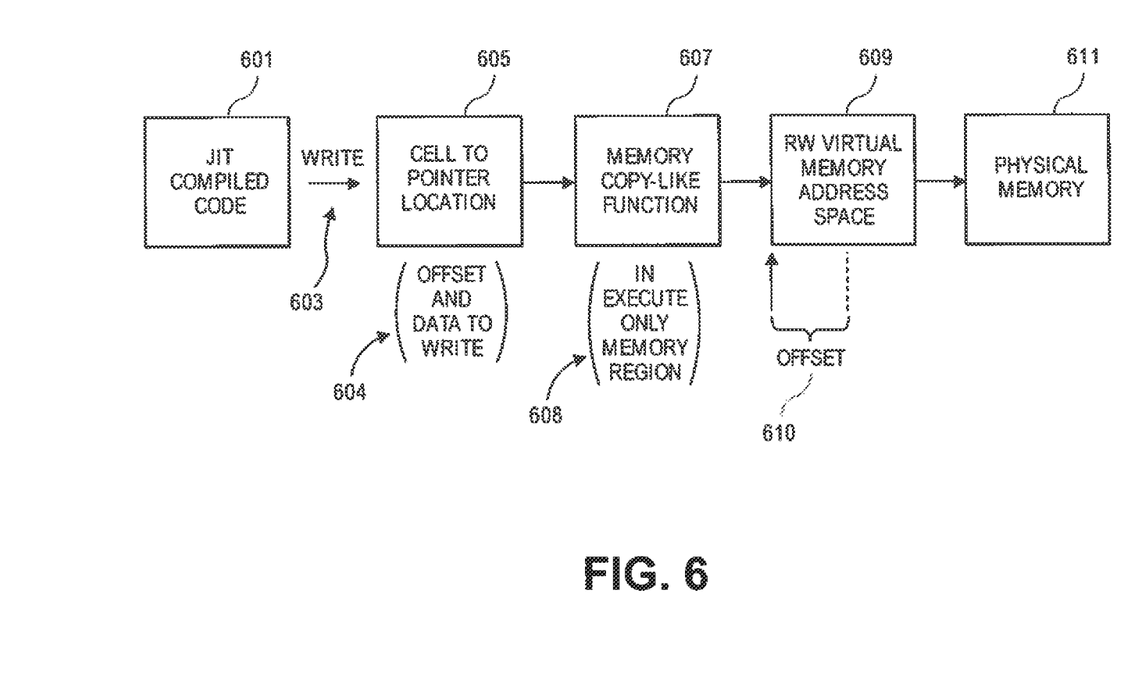
FIG. 6 shows a sequence of operations which result from an executing process that requires a write operation.

FIG. 6 shows an example of a process flow which occurs during a write operation required by the JIT compiler compiling code such as Javascript to produce the JIT compiled software, such as the JIT compiled software 209. The JIT compiler compiles the Javascript or other code and emits or produces compiled code (601) which is stored 603 using the executable function 607. The JIT compiler can cause a call 605 to the pointer location where the executable memory function 607 has been stored in a memory region that is execute only. The call 605 can include both an offset specifying a location in the RW virtual memory address space as well as the data (e.g. JIT compiled software in machine executable form) to write 604. The call 605 invokes the memory copy like function 607 which has been stored in execute only memory region 608 after the conversion of memory region in operation 509 of FIG. 5. The memory copy like function causes the data to be written (e.g. JIT compiled software) to be copied to the specified location in the RW virtual memory address space based upon the offset 610 supplied with the call 605. The virtual memory mapping between the RW virtual memory address space and the physical memory address space is then employed to store the data within the physical memory at the address specified by the virtual memory mapping which maps between the RW virtual memory address space and the physical memory (such as the virtual memory mapping 202). In one embodiment, the physical memory may be DRAM allocated to the JIT processes within a web browser's sandboxed memory space. In other embodiments, the sequence shown in FIG. 6 can be used for processes resulting from execution of the JIT compiled software after it has been stored in physical memory.

In an alternative embodiment, the methods and systems described herein can be employed with compilers which are not JIT compilers and can be employed with interpreters. For example, in the context of the compiler which compiles software prior to run time, a method according to an embodiment can include compiling, by the compiler prior to run time, software code to create compiled software, where the compiled software is to be stored in a readable and executable (RX) virtual memory address space at run time and the RX virtual memory address space is to be mapped to physical memory by a first virtual memory address mapping. Further, the compiler can create an executable function to be stored in a memory region which is at least initially writeable when the executable function is written to the memory region at run time. This executable function can be configured to copy at run time input data into a readable and writeable (RW) virtual memory address space at a specified offset, where the RW virtual memory address space is to be mapped to physical memory by a second virtual memory address mapping at run time. A compiler also creates executable software which at run time converts the memory region into an execute only memory region and stores a pointer to the converted memory region. The pointer is to be used during a write operation at run time by one or more processes resulting from execution of the compiled software in the RX virtual memory address space. Hence, at run time, when a request from the one or more processes requires the writing of data, the pointer is used to call the executable function to cause the data to be written, through the RW virtual memory space to the physical memory using the virtual memory mapping between the RW virtual memory address space and the physical memory address space.

Figure 7:
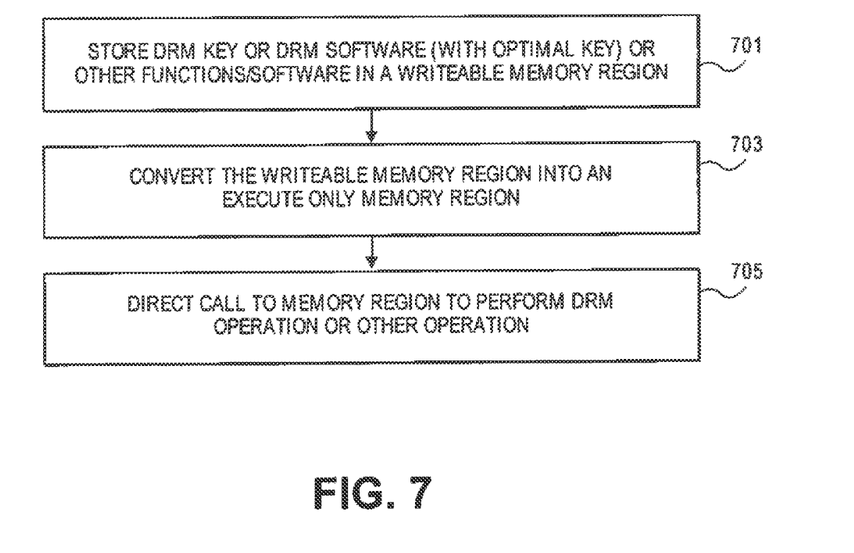
FIG. 7 is a flowchart that shows a method according to another embodiment described herein.

In another embodiment, a method can store a cryptographic function, such as a digital rights management (DRM) function and/or key, into a memory region that is initially writeable and then convert that memory region into an execute only memory region and then use the DRM function by using a pointer to the execute only memory region. For example, after the DRM function is stored in the memory region, other processes can pass data (e.g. an encrypted cryptographic key) to the DRM function to process the data with the DRM function in the execute only memory region. FIG. 7 shows an example of a method in which a cryptographic function (or other function) can be stored in such a memory region. In operation 701, a process (such as a compiler or other software component) can store the cryptographic function, DRM function or other function in a memory region that is at least initially writeable. In the case of a DRM function, the DRM function can be stored with one or more keys used in the DRM function in the memory region. Then in operation 703, that memory region is converted into an execute only memory region that is referenced by a pointer used to call for the execution of the function by a process that uses the function in operation 705. In operation 705, that process uses the pointer (and any data/parameters) to cause the execution of the function; the pointer and any data/parameters can be passed to the function so that the data/parameters can be processed by the function. For example, if the function is a DRM function to decrypt an encrypted cryptographic key, then the process seeking to decrypt the key uses the pointer (along with the encrypted cryptographic) to request execution of the DRM function using the cryptographic key as input data to the DRM function, and the output is the decrypted cryptographic key.

Figure 8:
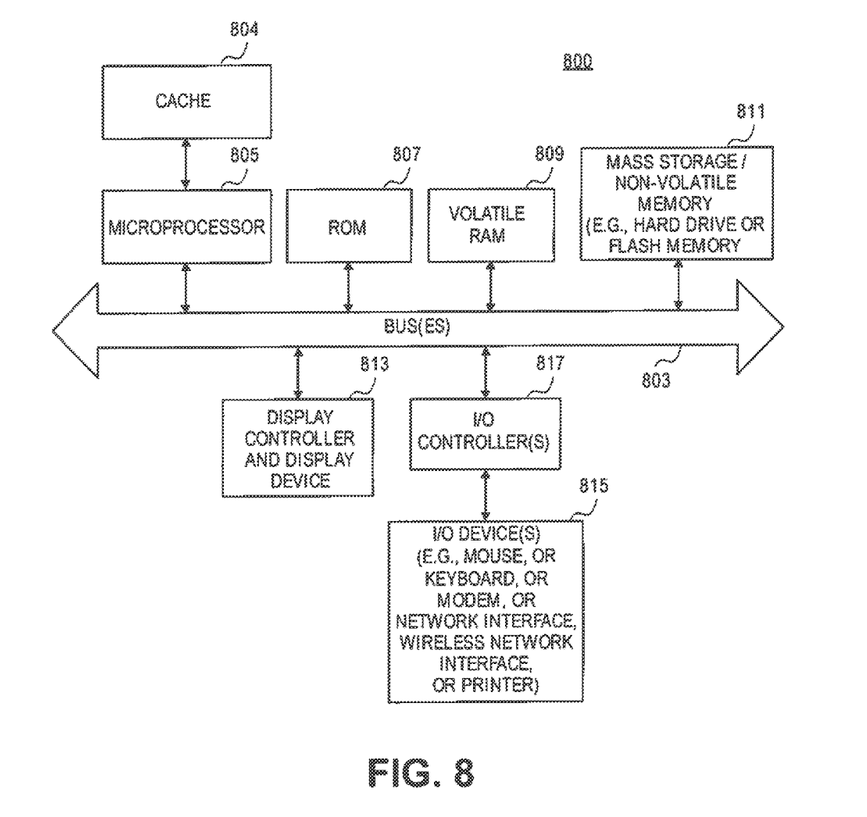
FIG. 8 is a block diagram of an example of a data processing system that can be used to implement or perform one or more embodiments described herein.

FIG. 8 shows one example of a data processing system, which may be used with any one of the embodiments described herein. Note that while FIG. 8 illustrates various components of a data processing system, it is not intended to represent any particular architecture or manner of interconnecting the components as such details are not germane to this description. It will also be appreciated that network computers, tablet computers, smartphones, consumer electronic devices and other data processing systems which have fewer components or perhaps more components may also be used with one or more embodiments described herein.

As shown in FIG. 8, the computer system 800, which is a form of a data processing system, includes a bus 803 which is coupled to one or more microprocessor(s) 805 and a ROM (Read Only Memory) 807 and volatile RAM 809 (e.g. DRAM) and a non-volatile memory 811. The one or more microprocessors 805 are coupled to optional cache 804. The one or more microprocessors 805 may retrieve the stored instructions from one or more of the non-transitory memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory system which maintain data (e.g., large amounts of data) even after power is removed from the system. Mass storage 811 is a persistent memory. Typically the mass storage 811 will also be a random access memory although this is not required. While FIG. 8 shows that the mass storage 811 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

This specification includes an appendix which provides a software listing that shows an example of an embodiment that has been described herein. This software listing or the associated software may be subject to open source licenses, such as an open source license associated with Webkit; see webkit.org.

The present description includes material protected by copyrights, such as the software listing in the appendix. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves copyrights to the extent permitted by the law and any open source licenses that may apply. Copyright Apple Inc.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed cause a method for executing code in a data processing system, the code compiled by a compiler, the method comprising:

creating a first virtual memory mapping from a readable and executable (RX) virtual memory space to physical memory, the physical memory being designated for use in storing code and data produced by the compiler;

creating a second virtual memory mapping from a readable and writeable (RW) virtual memory space to the physical memory, the RW virtual memory space for storing data used in one or more processes resulting from execution of software stored in the RX virtual memory space;

allocating a memory region in one or more pages of memory, the memory region being at least writeable;

writing into the memory region an executable function configured to copy input data into the RW virtual memory space at a specified offset;

converting the memory region, after the writing, into an execute only memory region having an execute only privilege;

storing a pointer to the memory region, the pointer being used during a write operation that uses the executable function;

compiling the code to create compiled software and storing the compiled software in the physical memory by using the pointer to call for the execution of the executable function to cause the compiled software to be written, through the RW virtual memory space to physical memory mapping, to the physical memory.

2. The medium as in claim 1, wherein the compiler is a Just-In-Time (JIT) compiler and the code is unsigned and the JIT compiler compiles the code at run time to create the compiled software.

3. The medium as in claim 2 wherein the JIT compiler is run in a web browser that processes web pages and the code is associated with one or more web pages, and wherein the RW virtual memory space is located at a random address and the memory region is located at a random address, and wherein an operating system allocates memory for the web browser and the physical memory designated for use in storing code and data produced by the JIT compiler is located within the memory allocated for the web browser.

4. The medium as in claim 3 wherein the JIT compiler is signed code and the web browser is signed code and the operating system has a set of components each of which is signed code and wherein the operating system performs a secure boot up procedure which verifies code signatures in a chain of trust starting from a boot Read-Only-Memory (ROM).

5. The medium as in claim 4 wherein the operating system controls access to memory based on access privileges which include: RW, RX and execute only.

6. The medium as in claim 5 wherein all executable software on the data processing system is signed code except for the unsigned code compiled by the JIT compiler.

7. The medium as in claim 1, wherein the compiler is a Just-In-Time (JIT) compiler and the JIT compiler compiles the code at run time to create the compiled software and wherein the call for the execution of the executable function uses a call that refers to the compiled software and also includes the specified offset which is an offset from a location in the RW virtual memory space and wherein pointers to addresses in the RX virtual memory space are used at run time during execution of the compiled software to invoke one or more functions in the compiled software.

8. The medium as in claim 7 wherein the executable function is a memory copy function in which the destination address of the memory copy function is the RW virtual memory space at the specified offset.

9. The medium as in claim 7 wherein the physical memory for use in storing executable software and data produced by the JIT compiler is a JIT physical memory and wherein the memory region is stored in the JIT physical memory and wherein the RX virtual memory space and the RW virtual memory space share the same physical memory.

10. The medium as in claim 7, the method further comprising zeroing out all pointers or references to the RW virtual memory space after storing the pointer to the memory region and wherein the allocating, the writing, the converting and the storing are performed by the JIT compiler and not by the compiled software.

11. A method for executing code in a data processing system, the code compiled by a compiler, the method comprising:
    creating a first virtual memory mapping from a readable and executable (RX) virtual memory space to physical memory, the physical memory being designated for use in storing code and data produced by the compiler;
    creating a second virtual memory mapping from a readable and writeable (RW) virtual memory space to the physical memory, the RW virtual memory space for storing data used in one or more processes resulting from execution of software stored in the RX virtual memory space;
    allocating a memory region in one or more pages of memory, the memory region being at least writeable;
    writing into the memory region an executable function configured to copy input data into the RW virtual memory space at a specified offset;
    converting the memory region, after the writing, into an execute only memory region having an execute only privilege;
    storing a pointer to the memory region, the pointer being used during a write operation that uses the executable function;
    compiling the code to create compiled software and storing the compiled software in the physical memory by using the pointer to call for the execution of the executable function to cause the compiled software to be written, through the RW virtual memory space to physical memory mapping, to the physical memory.

12. The method as in claim 11, wherein the compiler is a Just-In-Time (JIT) compiler and the code is unsigned and the JIT compiler compiles the code at run time to create the compiled software.

13. The method as in claim 12 wherein the JIT compiler is run in a web browser that processes web pages and the code is associated with one or more web pages, and wherein the RW virtual memory space is located at a random address and the memory region is located at a random address, and wherein an operating system allocates memory for the web browser and the physical memory designated for use in storing code and data produced by the JIT compiler is located within the memory allocated for the web browser.

14. The method as in claim 13 wherein the JIT compiler is signed code and the web browser is signed code and the operating system has a set of components each of which is signed code and wherein the operating system performs a secure boot up procedure which verifies code signatures in a chain of trust starting from a boot Read-Only-Memory (ROM).

15. The method as in claim 14 wherein the operating system controls access to memory based on access privileges which include: RW, RX and execute only.

16. The method as in claim 15 wherein all executable software on the data processing system is signed code except for the unsigned code compiled by the JIT compiler.

17. The method as in claim 11, wherein the compiler is a Just-In-Time (JIT) compiler and the JIT compiler compiles the code at run time to create the compiled software and wherein the call for the execution of the executable function uses a call that refers to the compiled software and also includes the specified offset which is an offset from a location in the RW virtual memory space and wherein pointers to addresses in the RX virtual memory space are used at run time during execution of the compiled software to invoke one or more functions in the compiled software.

18. The method as in claim 17 wherein the executable function is a memory copy function in which the destination address of the memory copy function is the RW virtual memory space at the specified offset.

19. The method as in claim 17 wherein the physical memory for use in storing executable software and data produced by the JIT compiler is a JIT physical memory and wherein the memory region is stored in the JIT physical memory and wherein the RX virtual memory space and the RW virtual memory space share the same physical memory.

20. The method as in claim 17, the method further comprising zeroing out pointers or references to the RW virtual memory space after storing the pointer to the memory region and wherein the allocating, the writing, the converting and the storing are performed by the JIT compiler and not by the compiled software.

21. A non-transitory machine readable medium storing executable program instructions which when executed by a data processing system cause the data processing system to perform a method comprising:
    compiling, by a compiler prior to run time, software code to create compiled software, the compiled software to be stored in a readable and executable (RX) virtual memory address space at run time, the RX virtual memory address space to be mapped to physical memory by a first virtual memory address mapping;
    creating, by the compiler, an executable function to be stored in a memory region which is at least writeable when the executable function is written to the memory region at run time, wherein the executable function is configured to copy at run time input data into a readable and writeable (RW) virtual memory address space at a specified offset, the RW virtual memory address space to be mapped to the physical memory by a second virtual memory address mapping at run time;
    creating, by the compiler, executable software which at run time converts the memory region into an execute only memory region and stores a pointer to the converted memory region, the pointer being used during a write operation, at run time, by one or more processes resulting from execution of the compiled software in the RX virtual memory address space, wherein at run time, when a request from the one or more processes requires writing first data, the pointer is used to call the executable function to cause the first data to be written, through the RW virtual memory address space, to the physical memory.

22. A non-transitory machine readable medium storing executable instructions which when executed cause a method for executing code in a data processing system, the method comprising:
    obtaining a memory region in one or more pages of memory, the memory region being at least writeable;
    writing into the memory region an executable function configured to write one or more functions or data into a writeable virtual memory space;
    converting the memory region, after the writing, into an execute only memory region having an execute only privilege;
    storing a pointer to the memory region, the pointer being used during a write operation that uses the executable function;
    receiving a request, from one or more processes, which requires writing functions or data, and using the pointer, calling the execution of the executable function to cause the functions or data to be written, through the writeable virtual memory space to physical memory mapping, to the physical memory.

23. The medium as in claim 22, wherein the method is performed at least in part by a Just-In-Time (JIT) compiler and the code is unsigned and the JIT compiler compiles the code at run time to create the compiled software and wherein the functions or data is compiled code that has been compiled by the JIT compiler and wherein the method further comprises:

creating a first virtual memory mapping from a readable and executable (RX) virtual memory space to physical memory, the physical memory being designated for use in storing code and data;

creating a second virtual memory mapping from a readable and writeable (RW) virtual memory space to the physical memory, the RW virtual memory space for storing data used in one or more processes resulting from execution of software stored in the RX virtual memory space.

24. The medium as in claim 23 wherein the JIT compiler is run in a web browser that processes web pages and the code is associated with one or more web pages, and wherein the RW virtual memory space is located at a random address and the memory region is located at a random address, and wherein an operating system allocates memory for the web browser and the physical memory designated for use in storing code and data produced by the JIT compiler is located within the memory allocated for the web browser and wherein the web browser and the JIT compiler are signed.

25. The medium as in claim 24, the method further comprising zeroing out pointers or references to the RW virtual memory space after storing the pointer to the memory region, and wherein pointers to addresses in the RX virtual memory space are used at run time during execution of the compiled software to invoke one or more functions in the compiled software.

26. The medium as in claim 22 wherein the method is performed at least in part by signed software code and wherein the one or more functions that are written by the executable function are software that is not signed.

27. A non-transitory machine readable medium storing executable instructions which when executed cause a method for executing code in a data processing system, the method comprising:

obtaining a memory region in one or more pages of memory, the memory region being at least writeable;

writing into the memory region an executable function configured to perform a cryptographic function;

converting the memory region, after the writing, into an execute only memory region having an execute only privilege;

storing a pointer to the memory region, the pointer being used in response to a request to perform the cryptographic function;

receiving a request, from one or more processes, which requires use of the cryptographic function, and using the pointer, calling the execution of the cryptographic function.

28. The medium as in claim 27 wherein the method further comprises:

creating a first virtual memory mapping from a readable and executable (RX) virtual memory space to physical memory, the physical memory being designated for use in storing code and data;

creating a second virtual memory mapping from a readable and writeable (RW) virtual memory space to the physical memory, the RW virtual memory space for storing data used in one or more processes resulting from execution of software stored in the RX virtual memory space.

29. The medium as in claim 28, the method further comprising zeroing out pointers or references to the RW virtual memory space after storing the pointer to the memory region, and wherein pointers to addresses in the RX virtual memory space are used at run time during execution to invoke the cryptographic function, and wherein the cryptographic function performs a digital rights management function.

* * * * *